(12) United States Patent
Jasso et al.

(10) Patent No.: US 7,535,454 B2
(45) Date of Patent: May 19, 2009

(54) METHOD AND APPARATUS FOR PROVIDING HAPTIC FEEDBACK

(75) Inventors: Alexander Jasso, San Jose, CA (US); Steven P. Vassallo, Redwood City, CA (US); Kenneth M. Martin, Los Gatos, CA (US)

(73) Assignee: Immersion Corporation, San Jose, CA (US)

( * ) Notice: Subject to any disclaimer, the term of this patent is extended or adjusted under 35 U.S.C. 154(b) by 298 days.

(21) Appl. No.: 10/442,578

(22) Filed: May 21, 2003

(65) Prior Publication Data

US 2004/0012560 A1   Jan. 22, 2004

Related U.S. Application Data

(63) Continuation-in-part of application No. 10/285,450, filed on Nov. 1, 2002, now Pat. No. 7,336,260.

(60) Provisional application No. 60/335,493, filed on Nov. 1, 2001, provisional application No. 60/399,883, filed on Jul. 31, 2002.

(51) Int. Cl.
*G09G 5/00* (2006.01)
(52) U.S. Cl. ........................ 345/156; 345/172
(58) Field of Classification Search ......... 345/156–173, 345/701, 702; 463/36–38, 30, 31; 200/5 A, 200/5 B; 341/27, 34–35; 715/700, 702; 434/272, 273
See application file for complete search history.

(56) References Cited

U.S. PATENT DOCUMENTS

| | | | |
|---|---|---|---|
| 2,972,140 A | 2/1961 | Hirsch | |
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,623,064 A | 11/1971 | Kagan | |
| 3,902,687 A | 9/1975 | Hightower | |
| 3,903,614 A | 9/1975 | Diamond et al. | |
| 3,911,416 A | 10/1975 | Feder | |
| 4,000,383 A | 12/1976 | Lockard | |
| 4,160,508 A | 7/1979 | Salsbury | |
| 4,221,941 A | 9/1980 | Genovese | |
| 4,236,325 A | 12/1980 | Hall et al. | |
| 4,262,549 A | 4/1981 | Schwellenbach | |
| 4,311,980 A | 1/1982 | Prudenziati | |

(Continued)

FOREIGN PATENT DOCUMENTS

EP         0349086         1/1990

(Continued)

OTHER PUBLICATIONS

PCT Search Report, corresponding to PCT/US03/28698, mailed on Feb. 18, 2004.

(Continued)

*Primary Examiner*—Nitin Patel
(74) *Attorney, Agent, or Firm*—Kilpatrick Stockton LLP (57) ABSTRACT

Products and processes for providing haptic feedback are described. One such product includes a rocker switch and an actuator in communication with the rocker switch. The rocker switch is operable to output a first signal. The actuator is operable to provide haptic feedback associated with the first signal.

19 Claims, 6 Drawing Sheets

U.S. PATENT DOCUMENTS

| | | | |
|---|---|---|---|
| 4,333,070 A | 6/1982 | Barnes |
| 4,383,154 A | 5/1983 | Sorenson |
| 4,464,117 A | 8/1984 | Forest |
| 4,484,191 A | 11/1984 | Vavra |
| 4,513,235 A | 4/1985 | Acklam et al. |
| 4,581,491 A | 4/1986 | Boothroyd |
| 4,581,972 A | 4/1986 | Hoshino |
| 4,599,070 A | 7/1986 | Hladky et al. |
| 4,692,756 A | 9/1987 | Clark |
| 4,708,656 A | 11/1987 | De Vries et al. |
| 4,713,007 A | 12/1987 | Alban |
| 4,725,817 A | 2/1988 | Wihlborg |
| 4,791,416 A | 12/1988 | Adler |
| 4,794,392 A | 12/1988 | Selinko |
| 4,795,296 A | 1/1989 | Jau |
| 4,798,919 A | 1/1989 | Miessler et al. |
| 4,821,030 A | 4/1989 | Batson et al. |
| 4,823,106 A | 4/1989 | Lovell |
| 4,840,634 A | 6/1989 | Muller et al. |
| 4,885,565 A | 12/1989 | Embach |
| 4,891,764 A | 1/1990 | McIntosh |
| 4,930,770 A | 6/1990 | Baker |
| 4,934,694 A | 6/1990 | McIntosh |
| 4,982,918 A | 1/1991 | Kaye |
| 4,983,786 A | 1/1991 | Stevens et al. |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin |
| 5,038,089 A | 8/1991 | Szakaly |
| 5,053,585 A | 10/1991 | Yaniger |
| 5,078,152 A | 1/1992 | Bond |
| 5,116,051 A | 5/1992 | Moncrief et al. |
| 5,165,897 A | 11/1992 | Johnson |
| 5,175,459 A | 12/1992 | Danial et al. |
| 5,182,557 A | 1/1993 | Lang |
| 5,186,695 A | 2/1993 | Mangseth et al. |
| 5,212,473 A | 5/1993 | Louis |
| 5,223,658 A | 6/1993 | Suzuki |
| 5,237,327 A | 8/1993 | Saitoh et al. |
| 5,240,417 A | 8/1993 | Smithson et al. |
| 5,241,308 A | 8/1993 | Young |
| 5,246,316 A | 9/1993 | Smith |
| 5,271,290 A | 12/1993 | Fischer |
| 5,275,174 A | 1/1994 | Cook |
| 5,283,970 A | 2/1994 | Aigner |
| 5,289,273 A | 2/1994 | Lang |
| 5,299,810 A | 4/1994 | Pierce |
| 5,309,140 A | 5/1994 | Everett |
| 5,334,027 A | 8/1994 | Wherlock |
| 5,355,148 A | 10/1994 | Anderson |
| 5,390,128 A | 2/1995 | Ryan et al. |
| 5,390,296 A | 2/1995 | Crandall et al. |
| 5,402,499 A | 3/1995 | Robinson et al. |
| 5,402,680 A | 4/1995 | Korenaga |
| 5,436,622 A | 7/1995 | Gutman et al. |
| 5,437,607 A | 8/1995 | Taylor |
| 5,451,924 A | 9/1995 | Massimino et al. |
| 5,461,711 A | 10/1995 | Wang et al. |
| 5,466,213 A | 11/1995 | Hogan |
| 5,489,812 A | 2/1996 | Furuhata et al. |
| 5,496,174 A | 3/1996 | Garner |
| 5,514,150 A | 5/1996 | Rostoker |
| 5,521,336 A | 5/1996 | Buchanan et al. |
| 5,547,382 A | 8/1996 | Yamasaki |
| 5,575,761 A | 11/1996 | Hajianpour |
| 5,586,033 A | 12/1996 | Hall |
| 5,631,861 A | 5/1997 | Kramer |
| 5,642,806 A | 7/1997 | Karadimas |
| 5,684,722 A | 11/1997 | Thorner et al. |
| 5,691,747 A | 11/1997 | Amano |
| 5,709,219 A | 1/1998 | Chen et al. |
| 5,729,249 A | 3/1998 | Yasutake |
| 5,766,016 A | 6/1998 | Sinclair |
| 5,767,457 A | 6/1998 | Gerpheide et al. |
| 5,785,630 A | 7/1998 | Bobick et al. |
| 5,791,992 A | 8/1998 | Crump et al. |
| 5,796,057 A | 8/1998 | Nakajima et al. |
| 5,803,243 A | 9/1998 | Nestor et al. |
| 5,826,710 A | 10/1998 | Kurek et al. |
| 5,836,443 A | 11/1998 | Gernhardt et al. |
| 5,844,392 A | 12/1998 | Peurach et al. |
| 5,857,986 A | 1/1999 | Moriyasu |
| 5,865,303 A | 2/1999 | Gernhardt et al. |
| 5,887,995 A | 3/1999 | Holehan |
| 5,889,670 A | 3/1999 | Schuler et al. |
| 5,889,672 A | 3/1999 | Schuler et al. |
| 5,943,044 A | 8/1999 | Martinelli et al. |
| 5,945,772 A | 8/1999 | Macnak et al. |
| 5,988,902 A | 11/1999 | Holehan |
| 5,999,168 A * | 12/1999 | Rosenberg et al. ........ 345/161 |
| 6,059,506 A | 5/2000 | Kramer |
| 6,067,871 A | 5/2000 | Markyvech et al. |
| 6,078,126 A | 6/2000 | Rollins et al. |
| 6,097,964 A | 8/2000 | Nuovo et al. |
| 6,111,577 A | 8/2000 | Zilles et al. |
| 6,130,393 A | 10/2000 | Chu |
| 6,131,097 A | 10/2000 | Peurach et al. |
| 6,154,201 A * | 11/2000 | Levin et al. ............... 345/184 |
| 6,160,489 A | 12/2000 | Perry et al. |
| 6,175,090 B1 | 1/2001 | Blossfeld |
| 6,195,592 B1 | 2/2001 | Schuler et al. |
| 6,198,206 B1 | 3/2001 | Saarmaa et al. |
| 6,218,966 B1 | 4/2001 | Goodwin et al. |
| 6,219,034 B1 | 4/2001 | Elbing et al. |
| 6,225,976 B1 | 5/2001 | Yates et al. |
| 6,243,078 B1 * | 6/2001 | Rosenberg ................ 345/161 |
| 6,339,201 B1 | 1/2002 | Balaban et al. |
| 6,347,997 B1 * | 2/2002 | Armstrong ................ 463/37 |
| 6,368,016 B1 | 4/2002 | Smith et al. |
| 6,374,255 B1 | 4/2002 | Peurach et al. |
| 6,422,941 B1 | 7/2002 | Thorner et al. |
| 6,429,846 B2 | 8/2002 | Rosenberg et al. |
| 6,476,794 B1 * | 11/2002 | Kataoka et al. ............ 345/161 |
| 6,498,601 B1 * | 12/2002 | Gujar et al. ............... 345/173 |
| 6,525,283 B2 | 2/2003 | Leng |
| 6,543,487 B2 | 4/2003 | Bazinet |
| 6,545,239 B2 * | 4/2003 | Spedale et al. ............. 200/553 |
| 6,636,197 B1 * | 10/2003 | Goldenberg et al. ........ 345/156 |
| 7,105,762 B1 * | 9/2006 | Lee ........................ 200/449 |
| 2002/0033795 A1 | 3/2002 | Shahoian et al. |
| 2002/0080116 A1* | 6/2002 | Onodera et al. ............ 345/161 |
| 2002/0103025 A1* | 8/2002 | Murzanski et al. .......... 463/37 |
| 2002/0128048 A1 | 9/2002 | Aaltonen et al. |
| 2002/0177471 A1 | 11/2002 | Kaaresoja et al. |

FOREIGN PATENT DOCUMENTS

| | | |
|---|---|---|
| WO | WO 95/20787 | 8/1995 |
| WO | WO 97/18546 | 5/1997 |
| WO | WO 01/91100 A1 | 11/2001 |
| WO | WO 02/31807 A1 | 4/2002 |

OTHER PUBLICATIONS

Wakiwaka et al., "Influence of Mover Support Structure on Linear Oscillatory Actuator for Cellular Phones," The Third International Symposium on Linear Drives for Industry Applications, 2001, p. 260-263, Nagano, Japan.

Baigrie, "Electric Control Loading—A Low Cost, High Performance Alternative," Proceedings, pp. 247-254, Nov. 6-8, 1990.

Iwata, Pen-based Haptic Virtual Environment, 0-7803-1363-1/93 IEEE, pp. 287-292, 1993.

Russo, "The Design and Implementation of a Three Degree of Freedom Force Output Joystick," MIT Libraries Archives Aug. 14, 1990, pp. 1-131, May 1990.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Jones et al., "A perceptual analysis of stiffness," ISSN 0014-4819 Springer International (Springer-Verlag); Experimental Brain Research, vol. 79, No. 1, pp. 150-156, 1990.

Burdea et al., "Distributed Virtual Force Feedback, Lecture Notes for Workshop on Force Display in Virtual Environments and its Application to Robotic Teleoperation," 1993 IEEE International conference on Robotics and Automation, pp. 25-44, May 2, 1993.

Snow et al., "Model-X Force-Reflecting-Hand-Controller," NT Control No. MPO-17851; JPL Case No. 5348, pp. 1-4, Jun. 15, 1989.

Ouh-Young, "Force Display in Molecular Docking," Order No. 9034744, p. 1-369, 1990.

Tadros, Control System Design for a Three Degree of Freedom Virtual Environment Simulator Using Motor/Brake Pair Actuators, MIT Archive © Massachusetts Institute of Technology, pp. 1-88, Feb. 1990.

Caldwell et al., "Enhanced Tactile Feedback (Tele-Taction) Using a Multi-Functional Sensory System," 1050-4729/93, pp. 955-960, 1993.

Adelstein, "Design and Implementation of a Force Reflecting Manipulandum for Manual Control research," DSC-vol. 42, Advances In Robotics, Edited by H. Kazerooni, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSC-vol. 42, Advances in Robotics, pp. 55-61, ASME 1992.

Russo, "Controlling Dissipative Magnetic Particle Brakes in Force Reflective Devices," DSC-vol. 42, Advances in Robotics, pp. 63-70, ASME 1992.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Adelstein, "A Virtual Environment System For The Study of Human Arm Tremor," Ph.D. Dissertation, Dept. of Mechanical Engineering, MIT, Jun. 1989.

Bejczy, "Sensors, Controls, and Man-Machine Interface for Advanced Teleoperation," Science, vol. 208, No. 4450, pp. 1327-1335, 1980.

Bejczy, "Generalization of Bilateral Force-Reflecting Control of Manipulators," Proceedings Of Fourth CISM-IFToMM, Sep. 8-12, 1981.

Mcaffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.

Jocobsen et al., "High Performance, Dextrous Telerobotic Manipulator With Force Reflection," Intervention/ROV '91 Conference & Exposition, Hollywood, Florida, May 21-23, 1991.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback In A Computer Mouse," Proceedings of fourteenth Annual Northeast Bioengineering Conference, University of New Hampshire, Mar. 10-11, 1988.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

Eberhardt et al., "OMAR—A Haptic display for speech perception by deaf and deaf-blind individuals," IEEE Virtual Reality Annual International Symposium, Seattle, WA, Sep. 18-22, 1993.

Rabinowitz et al., "Multidimensional tactile displays: Identification of vibratory intensity, frequency, and contactor area," Journal of The Acoustical Society of America, vol. 82, No. 4, Oct. 1987.

Bejczy et al., "Kinesthetic Coupling Between Operator and Remote Manipulator," International Computer Technology Conference, The American Society of Mechanical Engineers, San Franciso, CA, Aug. 12-15, 1980.

Bejczy et al., "A Laboratory Breadboard System For Dual-Arm Teleoperation," SOAR '89 Workshop, JSC, Houston, TX, Jul. 25-27, 1989.

Ouh-Young, "A Low-Cost Force Feedback Joystick and Its Use in PC Video Games," IEEE Transactions on Consumer Electronics, vol. 41, No. 3, Aug. 1995.

Marcus, "Touch Feedback In Surgery," Proceedings of Virtual Reality and Medicine The Cutting Edge, Sep. 8-11, 1994.

Bejczy, et al., "Universal Computer Control System (UCCS) For Space Telerobots," CH2413-3/87/0000/0318501.00 1987 IEEE, 1987.

Patrick, "Design, Construction, and Testing of a Fingertip Tactile Display for Interaction with Virtual and Remote Environments," Master of Science Thesis, MIT, Nov. 8, 1990.

Cadler, "Design of A Force-Feedback Touch-Introducing Actuator For Teleoperator Robot Control," Bachelor of Science Thesis, MIT, Jun. 23, 1983.

Wiker, "Teletouch Display Development: Phase 1 Report," Technical Report 1230, Naval Ocean Systems Center, San Diego, Apr. 17, 1989.

Bliss, "Optical-to-Tactile Image Conversion for the Blind," IEEE Transactions on Man-Machine Systems, vol. MMS-11, No 1, Mar. 1970.

Johnson, "Shape-Memory Alloy Tactile Feedback Actuator," Armstrong Aerospace Medical Research Laboratory, AAMRL-TR-90-039, Aug. 1990.

Kontarinis et al., "Tactile Display of Vibratory Information in Teleoperation and Virtual Environments," PRESENCE, 4(4):387-402, 1995.

Kontarinis et al., "Tactile Display of Vibratory Information in Teleoperation and Virtual Environments," PRESENCE, vol. 4, No. 4, pp. 387-402, 1995.

Lake, "Cyberman from Logitech," GameBytes, 1994.

British Patent Office, Great Britain Application No. GB0509761.3, Examination Report under Section 18(3), dated May 3, 2007, 2 pages.

British Patent Office, Great Britain Application No. GB0509761.3, Examination Report under Section 18(3), dated Dec. 13, 2006, 1 page.

British Patent Office, Great Britain Application No. GB0509761.3, Examination Report under Section 18(3), dated May 18, 2006, 1 page.

British Patent Office, Great Britain Application No. GB0618203.4, Examination Report under Section 18(3), dated May 3, 2007, 2 pages.

British Patent Office, Great Britain Application No. GB0618203.4, Search and Examination Report under Section 18(3), dated Oct. 20, 2006, 2 pages.

* cited by examiner

METHOD AND APPARATUS FOR PROVIDING HAPTIC FEEDBACK

RELATED APPLICATIONS AND CLAIM FOR PRIORITY

This application is a continuation-in-part of U.S. patent application Ser. No. 10/285,450, filed Nov. 1, 2002, now U.S. Pat. No. 7,336,260, which claims priority to U.S. Provisional Application No. 60/335,493, filed Nov. 1, 2001, and U.S. Provisional Application No. 60/399,883, filed Jul. 31, 2002, the priority benefit of which are also claimed by this application, and each of which is incorporated in its entirety herein by reference.

NOTICE OF COPYRIGHT PROTECTION

A portion of the disclosure of the patent document and its figures contain material subject to copyright protection. The copyright owner has no objection to the facsimile reproduction by anyone of the patent document, but otherwise reserves all copyrights whatsoever.

FIELD OF THE INVENTION

The present invention relates to products and processes for providing haptic feedback.

BACKGROUND

Handheld electronic devices, such as mobile phones, personal digital assistants (PDAs), pocket personal computers (PCs), gamepads, and camcorders, generally have multiple buttons that allow one to interface with the device by inputting information. The capabilities of these devices are increasing while the size and weight are decreasing to enhance their portability. For example, mobile phones, in addition to their traditional role as voice-communication devices, now include functions traditionally associated with other devices, such as electronic games, PDAs, and digital cameras.

To permit effective interaction with handheld devices, the handheld devices typically provide visual and aural cues or feedback. In addition to conventional visual and aural feedback, some of these devices attempt to enhance the effectiveness of device feedback by providing tactile cues or feedback. Some devices utilize structural tactile methods. One such example is to provide raised surfaces on the input surface, e.g., a keypad, of the device. Such methods, however, are inherently static and thus cannot offer effective tactile feedback.

Active methods of providing tactile feedback include incorporating a pager motor into handheld electronic devices. Such a method of providing haptic cues, however, generally vibrates the entire device.

The size of the input area in a handheld device limits the area used to provide haptic feedback. Furthermore, the amount of physical contact with the input area is generally limited to a small surface of a finger while inputting information to the device. Moreover, the act of inputting information to the device involves applying pressure against the input surface, thereby attenuating the haptic feedback conducted through the button or keypad. Thus, the number and effectiveness of haptic cues that can be conveyed in such a manner is very limited.

SUMMARY OF THE INVENTION

The present invention comprises products and processes for providing haptic feedback. In one exemplary embodiment, an apparatus comprises a switch and an actuator in communication with the rocker switch. The rocker switch is operable to output a first signal. The actuator is operable to provide haptic feedback associated with the first signal.

BRIEF DESCRIPTION OF THE DRAWINGS

The accompanying drawings, which constitute part of this specification, help to illustrate the embodiments of the invention. In the drawings, like numerals are used to indicate like elements throughout.

DETAILED DESCRIPTION

Embodiments of the present invention comprise products and processes for providing haptic feedback. One exemplary embodiment provides haptic feedback to an input area. In some interface devices, kinesthetic feedback (such as, without limitation, active and resistive force feedback), and/or tactile feedback (such as, without limitation, vibration, texture, and heat), is also provided to a user, more generally known collectively as "haptic feedback."

Embodiments of the present invention can be used in a wide variety of devices. Examples comprise mobile phones, cordless phones, PDAs, gamepads, remote controls, joystick handles, automotive controls (radios, compact disc (CD) players, automobile functions), consumer electronic devices, personal computers, laptop computers, pocket PCs, portable gaming devices, pagers, I-pagers, audio equipment, camcorders, televisions, security or alarm systems, Automated Teller Machines (ATMs), calculators, and home appliances.

Figure 1:
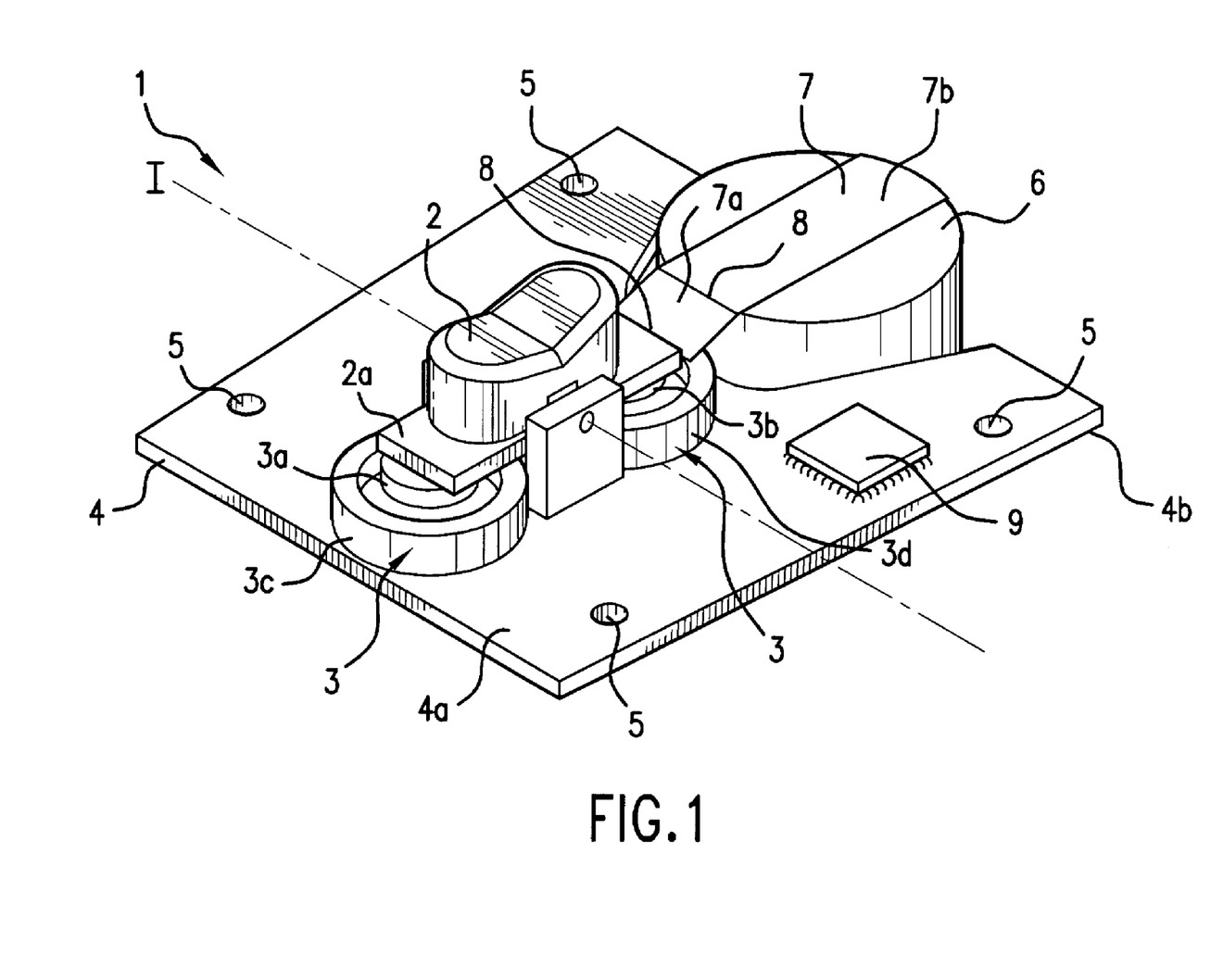
FIG. 1 is a perspective view of an embodiment of an apparatus according to the present invention.

FIG. 1 is a perspective view of an embodiment of the present invention. The apparatus 1 shown in FIG. 1 comprises a rocker switch 2 and an actuator 6. Generally, the rocker switch 2 has multiple positions for communicating a plurality of signals. In other embodiments, the rocker switch 2 comprises a force sensing resistor, a strain gauge based sensor, a scroll wheel, a mini-joystick, a touchpad, or a touch screen. Alternatively, other suitable switches can be used.

In one embodiment, the rocker switch 2 is coupled to a platform 2a. Platform 2a is used to communicate with contact 3. As used herein, the terms "communicate" and "communication" mean to mechanically, electrically, or otherwise contact, couple, or connect by either direct or indirect means. The contact 3 comprises first and second contacts 3a, 3b.

In the embodiment shown in FIG. 1, a perimeter of the platform 2a extends beyond the rocker switch 2 such that an entire surface of the rocker switch 2 can rest on or be attached to the platform 2a. In the embodiment shown, the platform 2a is a rectangular-like shape. Other suitable shapes may be used such that the platform 2 is of sufficient size and shape to communicate with both first and second contacts 3a, 3b. Alternatively, rocker switch 2 communicates with contact 3 directly, without platform 2a.

In one embodiment, rocker switch 2 is operable to pivot about axis I. The axis I is substantially perpendicular to the direction in which the rocker switch 2 pivots. In an alternate embodiment, rocker switch 2 is operable to pivot about an axis (not shown) substantially orthogonal to axis I. In another embodiment, rocker switch 2 is operable to pivot about an axis (not shown) substantially oblique to axis I. Alternatively, rocker switch 2 can pivot about other suitable axes.

The rocker switch 2 is operable to communicate with the contact 3 when the rocker switch 2 pivots. In one embodiment, first and second contacts 3a, 3b are each individual switches. In another embodiment (described in more detail below) first and second contacts 3a, 3b both comprise contacts for a single switch. Suitable switches include analog or digital switches, such as for example rubber switches, snap dome-type switches, and pressure switches.

In other embodiments, the contact 3 comprises an analog switch, a capacitive touch switch, a 3-way switch, a 4-way switch, or a 5-way switch. In one embodiment, the contact 3 is operable to produce distinct signals. Alternatively the contact 3 can include other suitable devices and configurations capable of communicating a signal. Other embodiments of switches are described in U.S. patent application Ser. No. 10/285,450, filed Nov. 1, 2002, which is incorporated in its entirety herein by reference.

In the embodiment shown, the rocker switch 2 pivots between two positions in which the rocker switch 2 contacts and activates first and second contacts 3a, 3b. The contacts 3a, 3b are, in one embodiment, circular in shape. Alternatively, other suitable shapes can be used. In one embodiment, compliant members 3c, 3d surround the first and second contacts 3a, 3b. In another embodiment, the compliant members 3c, 3d are disposed substantially or entirely about first and second contacts 3a, 3b. Alternatively, compliant members 3c, 3d are disposed only partially about first and second contacts 3a, 3b. In another alternate embodiment, there are no compliant members 3c, 3d.

The compliant members 3c, 3d in the embodiment shown are made of a pliable or malleable material, such as an elastomer, which allows the rocker switch 2 to continue to be displaced while being depressed. Suitable materials for compliant members 3c, 3d comprise those that can be physically deformed by the exertion of a human thumb or other digit against an input device or surface. Alternatively, other suitable materials can be used.

Figure 2:
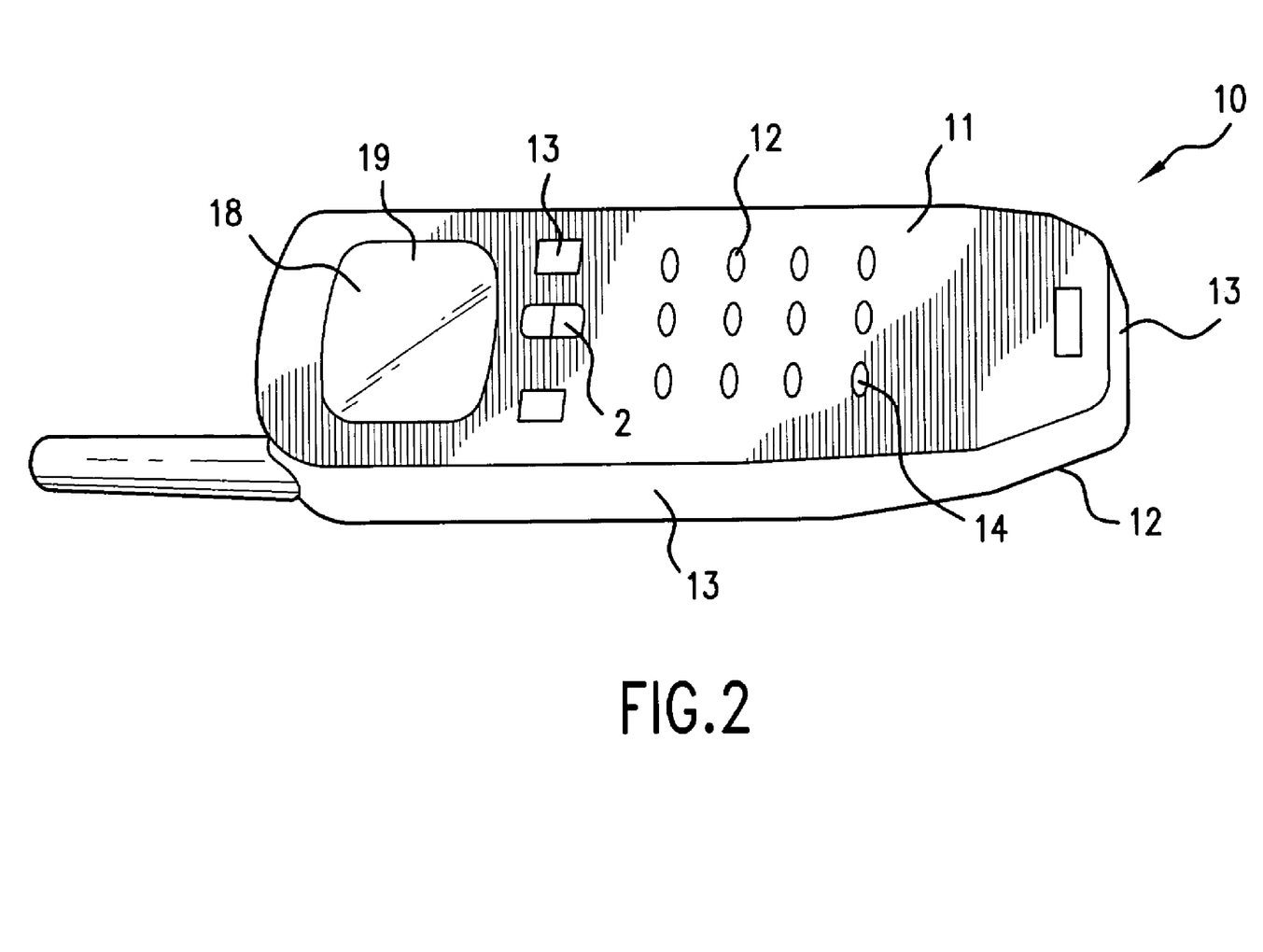
FIG. 2 is a perspective view of a mobile phone according to an embodiment of the present invention.

In one embodiment, the rocker switch 2 and the contact 3 are mounted on a first surface 4a of a Printed Circuit Board (PCB) 4 to facilitate electrical communication between the rocker switch 2 and an electronic device, such as, for example, the mobile phone shown in FIG. 2. PCB 4 comprises a second surface 4b disposed on a side opposite to first surface 4a. The PCB is generally shaped according to the space limitations of the device into which the apparatus 1 is placed. The PCB 4 also provides for secure mounting within the device by including, for example, a plurality of holes 5 to accept fasteners for securing to the electronic device. In another embodiment, the rocker switch 2 can be directly connected or mounted to the electronic device.

As mentioned above, the apparatus 1 shown also comprises an actuator 6, which is in communication with the rocker switch 2. The actuator 6 is operable to provide haptic feedback, for example, distinct tactile sensations, to rocker switch 2. Suitable tactile sensations include vibrations, for example, jolts and textures, and a plurality of distinct tactile sensations can be created by varying the frequency, amplitude and waveform output by the actuator 6.

The actuator 6 is selected to deliver the desired haptic feedback to rocker switch 2. The force delivered by actuator 6 to rocker switch 2 is capable of displacing rocker switch 2. Typically, the actuator 6 is a processor-controlled electromechanical actuator. In one embodiment, the actuator 6 is a voice coil actuator. Other suitable actuators can be used, including, for example, piezo-electric actuators, electro-active polymer actuators, eccentric mass actuators, moving magnet actuators, and resistive actuators. Resistive actuators may also be referred to as passive actuators, and include, for example, friction brakes in contact with metal shafts.

In addition, the actuator 6 can include a flexure, for example an arrangement of flexible material, coupled to the rotating shaft of a DC motor or step motor to transform the rotation of the motor shaft into vibrations or other haptic sensations. Various arrangements of a flexure coupled to a motor may be used as an actuator. For example, U.S. patent application Ser. No. 09/585,741, filed Jun. 2, 2002, illustrates suitable arrangements of flexures and motors for use as an actuator in embodiments of the present invention. U.S. patent application Ser. No. 09/585,741, assigned to the assignee of the present invention, is incorporated in its entirety herein by reference. In other embodiments, tactile sensations can be communicated to the rocker switch from a speaker included with an electronic device into which the apparatus 1 is placed, for example, the speaker in a mobile telephone or in a personal computer.

Although the embodiment shown in FIG. 1 comprises one rocker switch 2 and one actuator 6, other embodiments comprise a plurality of input devices, all in communication with a single actuator. Alternatively, other embodiments comprise a plurality of actuators each in communication with at least one rocker switch. Various arrangements of actuators in combination with input devices are suitable for use in the present invention.

For example, U.S. patent application Ser. No. 09/917,262, filed Jul. 26, 2001, and published on Mar. 21, 2002, as U.S. Patent Pub. No. US2002/0033795, illustrates actuators in combination with input devices that may be used in embodiments of the present invention. U.S. patent application Ser. No. 09/917,262, assigned to the assignee of the present invention, is incorporated in its entirety herein by reference.

As described above, the actuator 6 is in communication with the rocker switch 2. In one embodiment, the actuator 6 is in communication with rocker switch 2 through a biasing element 7. The biasing element 7 comprises a first end 7a and a second end 7b. Generally, the first end 7a of the biasing element 7 is in communication with the rocker switch 2 and the second end 7b of the biasing element 7 is in communication with the actuator 6. In one embodiment, the biasing element 7 comprises a lever arm. In another embodiment, the biasing element 7 comprises a cantilevered element, such as, for example, a cantilevered beam. The haptic feedback, including tactile sensations, generated by the actuator 6 propagate through the biasing element 7 to the rocker switch 2. The biasing element 7 amplifies the effective forces of the actuator communicated to the rocker switch 2, and thus, those felt by the user.

Suitable materials for the biasing element 7 are capable of transmitting or conducting resonances and tactile sensations. In one embodiment, the biasing element 7 is made of a spring steel. Alternatively, other suitable metals or other materials can be used. The biasing element 7 shown comprises one or more bends 8 to fit within the electronic device in which the apparatus 1 is disposed. Alternatively, no bends 8 are disposed in biasing element 7, as permitted by internal space within the electronic device. Other suitable shapes or placement of bends 8 may be used to fit the apparatus 1 within the space available in a particular electronic device.

In one embodiment, the actuator 6 is disposed distally from the rocker switch 2. Positioning the actuator 6 distally from the rocker switch 2 can further amplify the effective forces of the actuator communicated to the rocker switch 2. In another embodiment, the actuator 6 is coupled directly to the rocker switch 2 or to any other component of the rocker switch 2. Alternatively, the actuator 6 is mounted to the PCB 4 to which the input device is attached, communicating haptic feedback to the rocker switch 2 through the PCB 4. In another embodiment, the actuator 6 is an existing eccentric mass motor as is used, for example, as a vibrating ringer in a pager or mobile telephone.

The apparatus 1 also comprises a processor 9 in communication with the switch 3. The processor 9 is operable to receive a first signal from the switch 3 and to communicate a second signal to the actuator 6. In one embodiment, the processor 9 receives additional information from the switch 3, including the position of the rocker switch 2 and the amount of pressure applied to the rocker switch 2. In another embodiment, the first signal includes information related to the amount of pressure applied to the rocker switch 2, information related to the position of the rocker switch 2, or a combination of information about pressure and position.

In one embodiment, the processor 9 is also in communication with the actuator 6. The processor 9 is operable to produce and communicate a second signal to the actuator 6, which is associated with the input or first signal received by the processor 9 from the rocker switch 2. Thus, the haptic feedback is associated with the input or first signal.

The processor 9 provides the actuator 6 with a different wave form, frequency and/or other magnitude as haptic feedback in relation to different pressures, modes, menus, and other functionality. For example, in one embodiment, a number of occurrences of a distinct haptic sensation, such as a jolt, corresponds to an index number of a menu option within a list of menu options. In such an embodiment, one jolt signifies a first option, two jolts signify a second option, etc. In another embodiment, a distinct haptic sensation signifies that the user is cycling from the end of a particular menu back to the beginning, i.e., "rolling over."

In another embodiment, the haptic feedback can indicate several modes from which a user can select. For example, in a first mode, the processor 9 is operable to associate a value of a setting, such as, for example, a position or motion of the rocker switch 2. Haptic feedback, such as force detents, are output to the rocker switch 2 to indicate the particular setting. In a second mode, the processor 9 is operable to control a rate of change of the value of the setting. For example, another force detent, a different number of force detents, or a different frequency between force detents can be output to indicate how much the particular value, such as volume, has been changed. Other examples of haptic cues are described in U.S. patent application Ser. No. 10/285,450, filed Nov. 1, 2002, which is incorporated in its entirety herein by reference.

The processor 9 is located in a suitable location according to the needs of the device in which the apparatus 1 is placed. In the embodiment shown in FIG. 1, the processor is attached to the first surface 4a of PCB 4. Suitable processors include, for example, digital logical processors capable of processing input, execute algorithms, and generate output, as necessary to create the desired haptic effect in the rocker switch 2 in response to the inputs received from the rocker switch 2.

Other suitable processors include, for example, a microprocessor, an Application Specific Integrated Circuit (ASIC), and state machines. Such processors include, or may be in communication with, media, for example computer readable media, which store instructions that, when executed by the processor, cause the processor to perform the steps described herein as carried out, or assisted, by a processor. Other suitable structures that can communicate an actuation signal may be used.

One embodiment of a suitable computer-readable medium includes an electronic, optical, magnetic, or other storage transmission device capable of providing a processor, such as the processor in a web server, with computer-readable instructions. Other examples of suitable media include, but are not limited to, a floppy disk, CD-ROM, magnetic disk, memory chip, ROM, RAM, ASIC, operable processor, all optical media, all magnetic tape or other magnetic media, or any other medium from which a computer processor can read. Also, various other forms of computer-readable media may transmit or carry instructions to a computer, including a router, private or public network, or other transmission device or channel.

In one embodiment, the apparatus 1 comprises a dedicated processor 9 for use specifically with the apparatus 1. This embodiment is particularly well suited for applications where the apparatus 1 is retrofitted into an existing device. In another embodiment, the processor is the microprocessor or Central Processing Unit (CPU) of the device in which the apparatus 1 is disposed.

The apparatus 1 can also include additional circuitry such as the drive circuitry (not shown) necessary to create the haptic feedback in the actuator 6 in response to input from the processor 9 and a memory medium for storing data to be accessed by the processor 9, for example, a correlation between the tactile sensations to be produced in the actuator 6 and the input information or first signal received from the rocker switch 2.

An exemplary embodiment of apparatus 1 has been described above and with reference to FIG. 1. The apparatus 1 is not limited to the specific arrangement and configuration described above and as shown in FIG. 1. Other suitable arrangements and configurations can be used in alternate embodiments, such as those described in U.S. patent application Ser. No. 10/285,450, filed Nov. 1, 2002, which is incorporated in its entirety herein by reference.

FIG. 2 is a perspective view showing a mobile phone 10 according to an embodiment of the present invention. The phone 10 comprises a first surface 11, a second surface 12, and a plurality of walls 13. The walls 13 define a volume 14 (shown in FIG. 3). As shown in FIG. 2, the walls 13 are coupled to the first surface 11 and the second surface 12.

Disposed in the first surface 11 is rocker switch 2 and a plurality of input members 12. The input members 12 comprise a keypad 14 and a touch-sensitive screen 18, which is disposed in a video display screen 19. Other embodiments, as described above, comprise, for example, D-pads, scroll wheels, and toggle switches. Information—through the generation of a signal—is generally input into the phone 10 through the rocker switch 2 and the input members 12 disposed in the first surface 11. Information can be input by physically contacting the rocker switch 2 and the input members 12.

Figure 3:
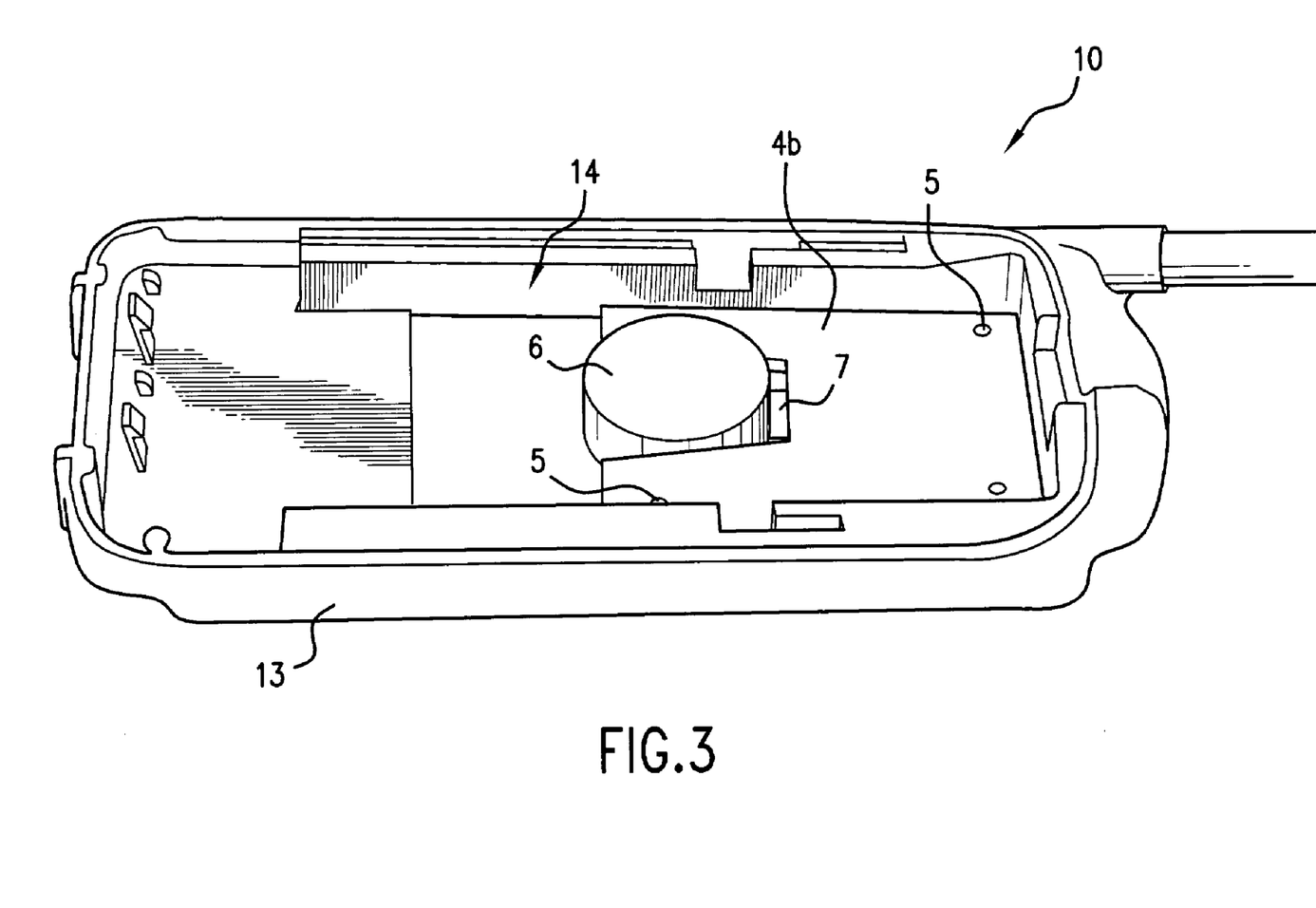
FIG. 3 is a perspective view of a surface of the mobile phone of FIG. 2.

Referring now to FIG. 3, a perspective view of an internal surface of the phone 10 of FIG. 2 is shown. The internal surface includes the volume 14. The apparatus 1 is disposed in the volume 14 of the phone 10. In one embodiment, the apparatus 1 is secured to the internal surfaces forming the volume by fastening elements (not shown) penetrating the holes 5 of the PCB 4. Alternatively, the apparatus 1 can be secured in the volume 14 by a frictional fit. Other suitable methods of coupling the apparatus to the phone 10 can be used.

Figure 4:
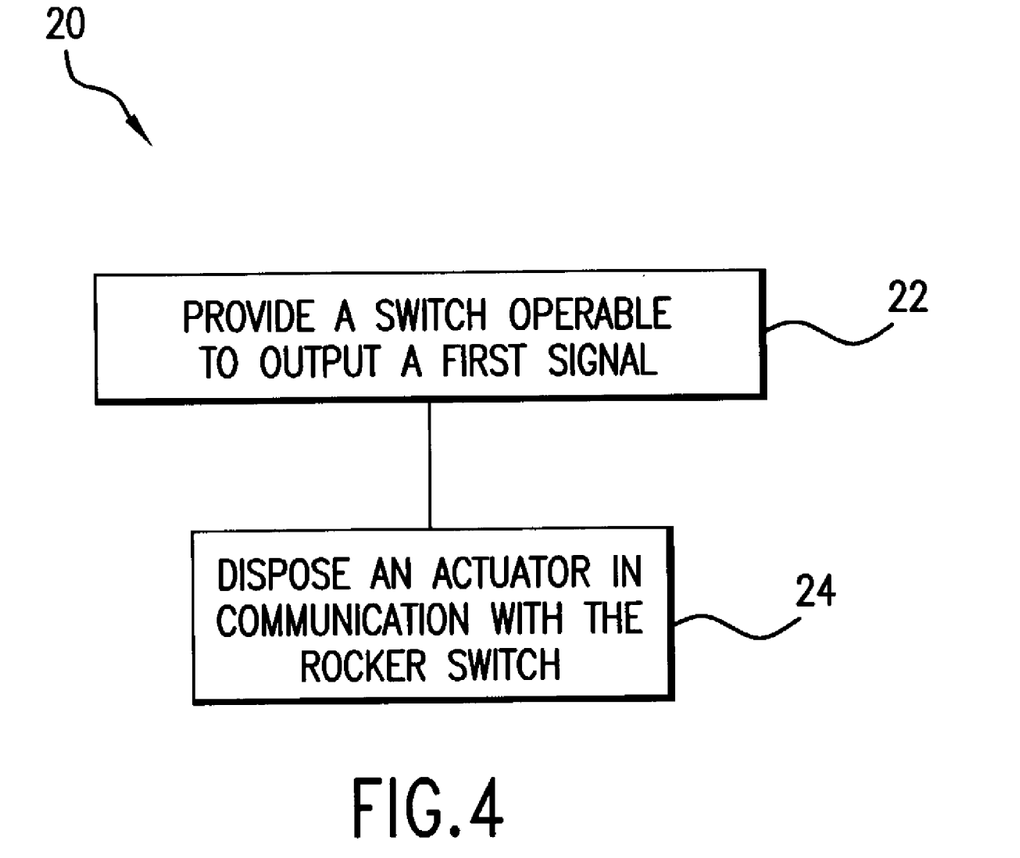
FIG. 4 shows a block diagram of an embodiment of a method according to the present invention.

FIG. 4 shows an embodiment of a method 20 according to the present invention. The method 20 may be employed to make a device that provides haptic feedback to an input area, such as for example, the apparatus 1 for use in the phone 10 described above. Items shown in FIGS. 1-3 are referred to in describing FIG. 4 to aid understanding of the embodiment of the method 20 shown. However, embodiments of methods according to the present invention may be employed to make a wide variety of other devices, including, without limitation, gamepads, PDAs, pagers, and automotive structures.

Referring now to FIG. 4, block 22 indicates that a rocker switch is provided. The rocker switch is operable to output a first signal. The switch can be as that described above with reference to FIGS. 1-3. For example, the switch can be several switches or a single switch having several contacts. Alternatively, other suitable switches can be used.

Typically, the rocker switch is operable to pivot about a first axis and to communicate with a contact. In one embodiment, the rocker switch is operable to pivot about a second axis, which is substantially orthogonal to the first axis. In another embodiment, the rocker switch is operable to pivot about a third axis, which is substantially oblique to the first axis.

In one embodiment, the method 20 includes disposing a compliant member proximate the rocker switch. The compliant member can be as that described above. Alternatively, other suitable complaint members can be used. As described above, the compliant member can be an elastomer, which is physically deformable when the rocker switch is depressed. The compliant member is operable to permit a user to continue to sense haptic feedback while continuing to depress the rocker switch.

Still referring to FIG. 4, block 24 indicates that an actuator is disposed in communication with the rocker switch. The actuator is operable to provide haptic feedback associated with the first signal. The actuator can be as that described above with reference to FIGS. 1-3. Alternatively, other suitable actuators can be used. Generally, the haptic feedback is provided to the user through the user's contact—either direct or indirect—with the rocker switch.

In one embodiment, the method 20 includes providing a processor operable to communicate a second signal to the actuator. In another embodiment, the processor is operable to receive the first signal. The processor is operable to control the haptic feedback, which is associated with the first signal. The processor can be as that described above with reference to FIGS. 1-3. Alternatively, other suitable processors can be used.

In another embodiment, the processor is operable to associate a value with a setting of the rocker switch in a first mode and to control a rate of change of the value in a second mode. The modes and settings can be similar to that described above. Alternatively, other suitable settings and modes can be used.

Figure 5:
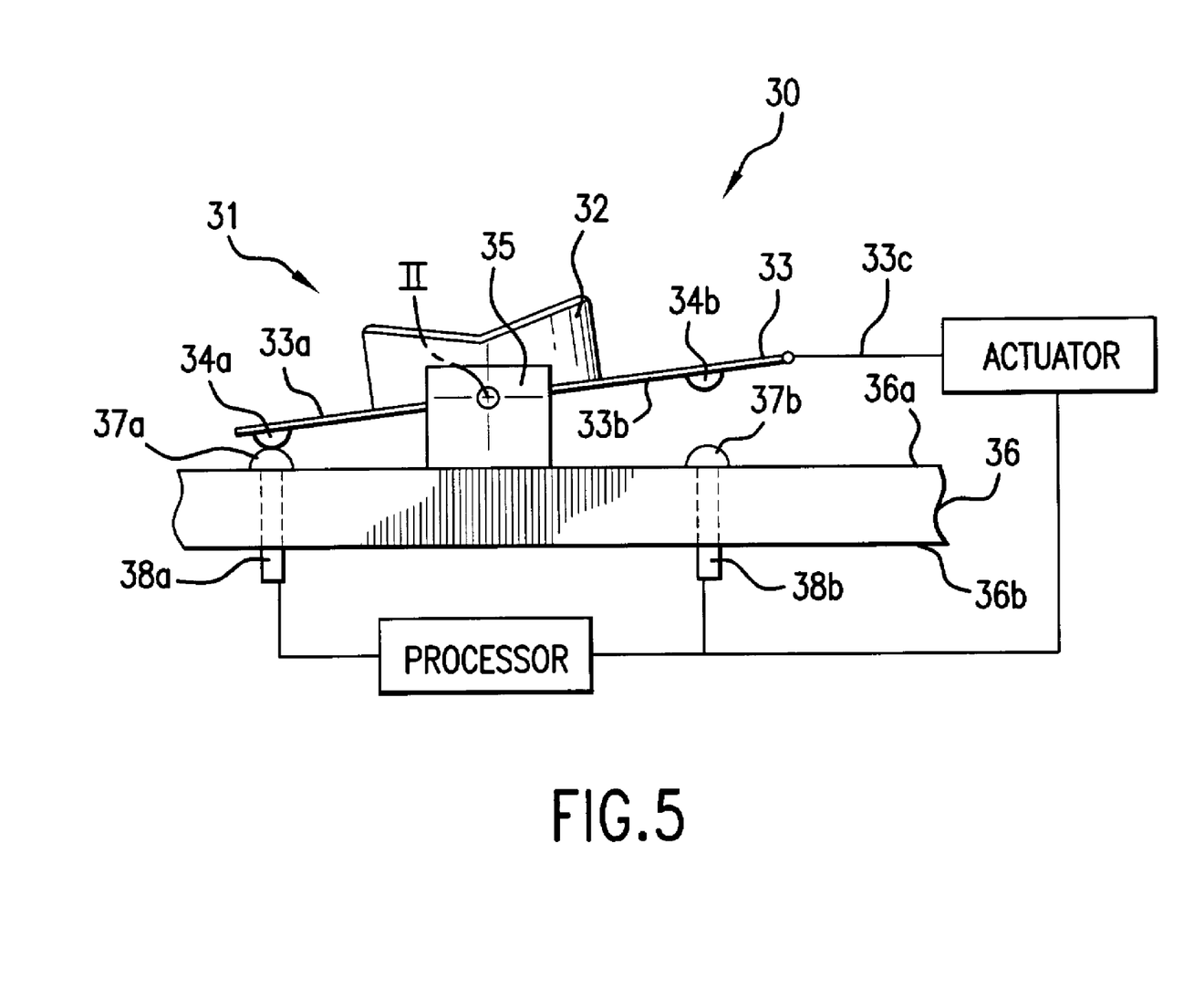
FIG. 5 is a schematic of an alternate embodiment of an apparatus according to the present invention.

Referring now to FIG. 5, an alternate embodiment of an apparatus 30 according to the present invention is shown. The apparatus 30 comprises a switch 31 and an actuator. The switch 31 comprises an input element 32, a platform 33, first and second contact pads 34a, 34b, and first and second contacts 37a, 37b. In the embodiment shown, the input element 32, platform 33, and first and second contact pads 34a, 34b collectively form a contact assembly.

Suitable switches include analog or digital switches, such as, for example, rubber switches, snap dome-type switches, and pressure switches. In other embodiments, the switch 31 includes an analog switch, a capacitive touch switch, a 3-way switch, a 4-way switch, or a 5-way switch. In one embodiment, the switch 31 is operable to produce distinct signals. Alternatively, the switch 31 can include other suitable devices and configurations capable of communicating a signal.

In the embodiment shown in FIG. 5, the input element 32 is mounted on a first surface 33a of the platform 33, and is adapted to correspond to a user's thumb or digit or other object, such as a stylus. The platform 33 extends beyond the input element 32 such that an entire surface of the input element 32 can rest on or be attached to the platform 33. In one embodiment, the platform 33 is rectangular-like shaped. Other suitable shapes may be used such that the platform 33 is of sufficient size and shape to communicate first and second contact pads 34a, 34b with first and second contacts 37a, 37b.

Still referring to FIG. 5, first and second contact pads 34a, 34b are mounted on opposite ends of the platform 33 on a second surface 33b of the platform 33. In the embodiment shown, first and second contact pads 34a, 34b are dome-like shaped. Alternatively, other suitable shapes for first and second contact pads 34a, 34b can be used. First and second contacts 37a, 37b are coupled to the first surface 36a of the base 36. First and second contacts 37a, 37b are dome-like shaped. Other suitable shapes for the first and second contacts 37a, 37b can be used. The first and second contact pads 34a, 34b and first and second contacts 37a, 37b are made of electrically conductive materials.

The platform 33 is supported by a support 35. In one embodiment, the support 35 includes two similarly-shaped panels disposed on opposing sides of the platform 33. One end of support 35 is coupled to a first surface 36a of a base 36. In another embodiment, the support 35 includes a single columnar or block-shaped member to which platform 33 is coupled. The platform 33 is biased to a centered or neutral position, which is substantially parallel to the first surface 36a of the base 36. In one embodiment, the base 36 is a PCB.

In the embodiment shown, the platform 33 pivots about an axis II relative to the base 36 between two positions in which one of first and second contacts 37a, 37b is activated. For example, first contact 37a is activated when engaged by first contact pad 34a and second contact 37b is activated when engaged by second contact pad 34b. Alternatively, platform 33 can pivot about other suitable axes.

In one embodiment, compliant members (not shown) are disposed substantially or entirely about first and second contacts 37a, 37b. Alternatively, compliant members are disposed only partially about first and second contacts 37a, 37b. The compliant members are made of a pliable or malleable material, such as an elastomer, as described in detail above. In another embodiment, there are no compliant members.

A first terminal 38a and a second terminal 38b are disposed entirely through the base 36, i.e., from a first surface 36a and a second surface 36b of the base. One end of the first terminal 38a is in communication with the first contact 37a. An opposite end of the first terminal 38a is in communication with a ground terminal and a processor. One end of the second terminal 38b is in communication with the second contact 37b. An opposite end of the second terminal 38b is in communication with a positive terminal and the processor.

The apparatus 30 also includes an actuator, which is in communication with the input element 32. As described above, the actuator is operable to provide a processor-controlled force to the input element 32. The actuator is selected to deliver the desired processor-controlled force to input element 32. The force delivered by the actuator to the input element 32 is capable of displacing the contact assembly. Generally, the actuator shown in FIG. 5 is a voice coil actuator. As described above, other suitable actuators and arrangements of actuators can be used.

The actuator is in communication with the input element 32 through a biasing element 33c. The haptic feedback generated by the actuator propagates through the biasing element 33c to the input element 32. The biasing element 33c amplifies the effective forces of the actuator communicated to the input element 32, and thus, those felt by the user. Generally, one end of the biasing element 33c is in communication with the input element 32 and an opposite end of the biasing element 33c is in communication with the actuator. In one embodiment, the biasing element 33c comprises a lever arm. Other suitable embodiments and configurations of the biasing element 33c can be used, such as that described above.

The apparatus 30 also includes a processor in communication with the switch 31. In one embodiment, the processor is in communication with the first and second terminals 38a, 38b. The processor is operable to receive a first signal from the switch 31 and to communicate a second signal to the actuator. In one embodiment, the processor receives additional information from the switch 31, including the position of the input element 32 and the amount of pressure applied to the input element 32. In another embodiment, the first signal includes information related to the amount of pressure applied to the input element 32, the position of the input element 32, or a combination of pressure and position.

Typically, the processor is also in communication with the actuator. The processor is operable to produce and communicate a second signal to the actuator, which is associated with the input or first signal received by the processor from the input element 32. Thus, the processor-controlled force is associated with the input or first signal. The various configurations and functioning of the processor and actuator are similar to that described in detail above, and thus, will not be described here in further detail.

Figure 6:
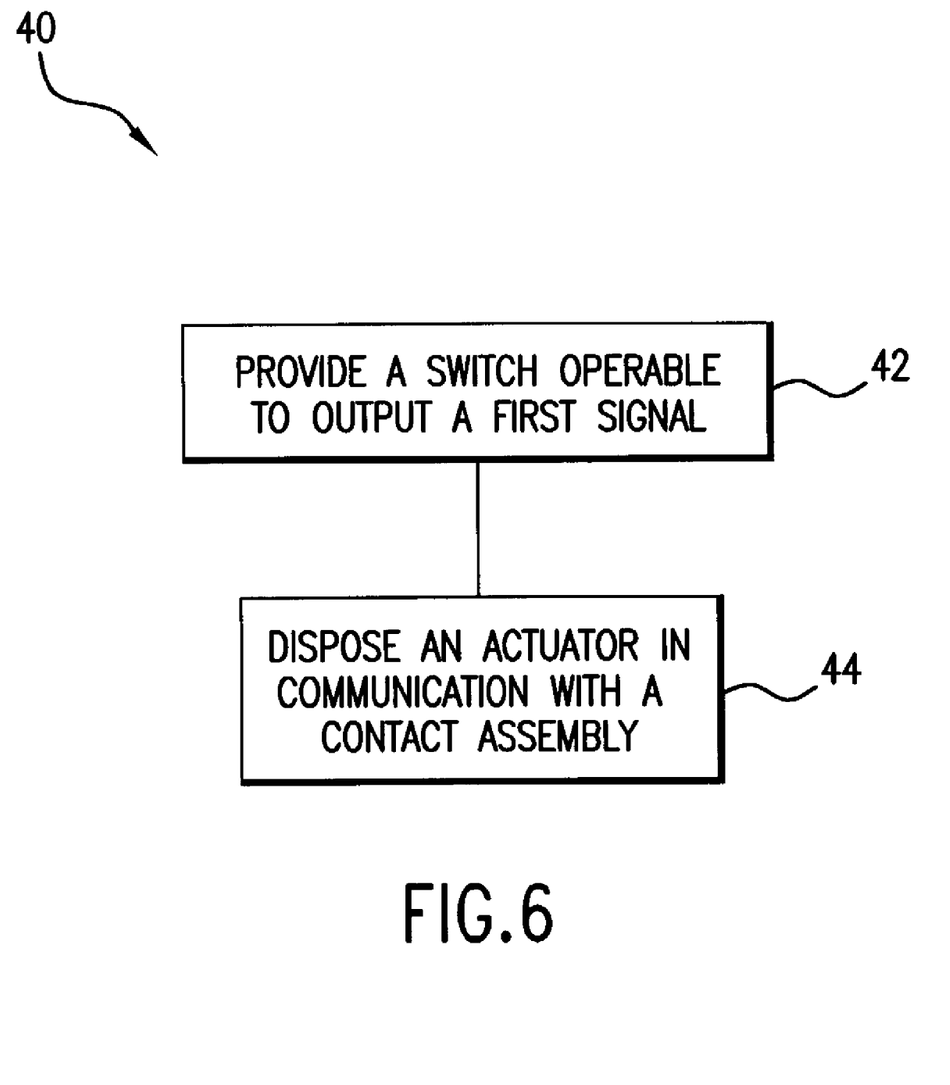
FIG. 6 shows a block diagram of an alternate embodiment of a method according to the present invention.

Referring now to FIG. 6, an alternate embodiment of a method according to the present invention is shown. The method 40 may be employed to make a device that provides haptic feedback to an input area, such as for example, the apparatus 30, as described above. Items shown in FIG. 5 are referred to in describing FIG. 6 to aid understanding of the embodiment of the method 40 shown. However, embodiments of methods according to the present invention may be employed to make a wide variety of other devices, including, without limitation, gamepads, PDAs, pagers, and automotive structures.

As shown in FIG. 6, block 42 indicates that a switch is provided. The switch is operable to output a first signal. The switch includes a first contact, a second contact, and a contact assembly operable to communicate with the first and second contacts. In one embodiment, the contact assembly is similar to that described above with reference to FIG. 5—that is, a contact assembly comprising an input element, a platform, and contact pads. Generally, the switch is similar to that described above with reference to FIG. 5. Alternatively, other suitable contact assemblies and switches can be used.

In one embodiment, the method includes disposing a first compliant member proximate the first contact and a second compliant member proximate the second contact. The first and second compliant members can be as that described in detail above. The compliant members permit a user to continue to sense haptic feedback while continuing to depress the contact assembly.

Still referring to FIG. 6, block 44 indicates that an actuator is disposed in communication with the contact assembly. The actuator is operable to provide a processor-controlled force to the contact assembly. The actuator can be as that described in detail above. The processor-controlled force displaces the contact assembly. Generally, the processor-controlled force is provided to the user through the user's contact with the contact assembly.

In one embodiment, the method 40 includes providing a processor operable to communicate a second signal to the actuator. In another embodiment, the processor is operable to receive the first signal. The processor is operable to control the processor-controlled force, which is associated with the first signal. The processor can be as that described above with reference to FIGS. 1-3 and 5. Alternatively, other suitable processors can be used.

In another embodiment, the processor is operable to associate a value with a setting of the contact assembly in a first mode and to control a rate of change of the value in a second mode. The modes and settings can be similar to that described in detail above. Alternatively, other suitable settings and modes can be used.

While the present invention has been disclosed with reference to certain embodiments, numerous modifications, alterations, and changes to the described embodiments are possible without departing from the sphere and scope of the present invention, as defined by the appended claims. Accordingly, it is intended that the present invention not be limited to the described embodiments, but that it has the full scope defined by the language of the following claims, and equivalents thereof.

What is claimed is:

1. An apparatus comprising:
 a rocker switch operable to output a first signal to a processor operable to associate a value with a setting of the rocker switch in a first mode and to control a rate of change of the value in a second mode;
 an actuator in communication with the rocker switch, the actuator operable to receive from the processor a second signal associated with the first signal and provide haptic feedback associated with the second signal; and
 a biasing element comprising a first end and a second end, the first end in communication with the rocker switch and the second end in communication with the actuator, the biasing element configured to amplify haptic feedback provided by the actuator.

2. The apparatus of claim 1, wherein the actuator comprises a processor-controlled electro-mechanical actuator.

3. The apparatus of claim 2, wherein the actuator is selected from the group consisting of voice coil actuators, piezo-electric actuators, electro-active polymer actuators, eccentric mass actuators, moving magnet actuators, and resistive actuators.

4. The apparatus of claim 1, further comprising a compliant member disposed proximate to the rocker switch.

5. An apparatus comprising:
 a switch operable to output a first signal, the switch comprising a first contact, a second contact, and a contact assembly operable to communicate with the first contact and the second contact;
 a processor operable to associate a value with a setting of the switch in a first mode and to control a rate of change of the value in a second mode;

an actuator in communication with the contact assembly, the actuator operable to provide a processor-controlled force to the contact assembly; and a biasing element comprising a first end and a second end, the first end in communication with the switch and the second end in communication with the actuator, the biasing element configured to amplify the processor-controlled force.

6. The apparatus of claim 5, further comprising a processor operable to receive the first signal and to communicate a second signal to the actuator, the second signal associated with the first signal.

7. The apparatus of claim 5, wherein the actuator comprises a processor-controlled electro-mechanical actuator.

8. The apparatus of claim 7, wherein the actuator is selected from the group consisting of voice coil actuators, piezo-electric actuators, electro-active polymer actuators, eccentric mass actuators, moving magnet actuators, and resistive actuators.

9. The apparatus of claim 5, further comprising a first compliant member disposed proximate the first contact and a second compliant member disposed proximate the second contact.

10. The apparatus of claim 5, further comprising the contact assembly operable to be displaced upon receiving the processor-controlled force.

11. A method comprising:
providing a rocker switch operable to output a first signal to a processor operable to associate a value with a setting of the rocker switch in a first mode and to control a rate of change of the value in a second mode;
disposing an actuator in communication with the rocker switch, the actuator operable to receive from the processor a second signal associated with the first signal and provide haptic feedback associated with the second signal; and
providing a biasing element comprising a first end and a second end, the first end in communication with the rocker switch and the second end in communication with the actuator, the biasing element configured to amplify haptic feedback provided by the actuator.

12. The method of claim 11, wherein the actuator comprises a processor-controlled electro-mechanical actuator.

13. The method of claim 12, wherein the actuator is selected from the group consisting of voice coil actuators, piezo-electric actuators, electro-active polymer actuators, eccentric mass actuators, moving magnet actuators, and resistive actuators.

14. The method of claim 11, further comprising disposing a compliant member proximate the switch.

15. A method comprising:
providing a switch operable to output a first signal, the switch comprising a first contact, a second contact, and a contact assembly operable to communicate with the first contact and the second contact;
providing a processor operable to associate a value with a setting of the switch in a first mode and to control a rate of change of the value in a second mode;
disposing an actuator in communication with the contact assembly, the actuator operable to provide a processor-controlled force to the contact assembly, the processor-controlled force displacing the contact assembly; and
providing a biasing element comprising a first end and a second end, the first end in communication with the switch and the second end in communication with the actuator, the biasing element configured to amplify the processor-controlled force.

16. The method of claim 15, further comprising providing a processor operable to receive the first signal and to communicate a second signal to the actuator, the second signal associated with the first signal.

17. The method of claim 15, wherein the actuator comprises a processor-controlled electro-mechanical actuator.

18. The method of claim 17, wherein the actuator is selected from the group consisting of voice coil actuators, piezo-electric actuators, electro-active polymer actuators, eccentric mass actuators, moving magnet actuators, and resistive actuators.

19. The method of claim 15, further comprising:
disposing a first compliant member proximate the first contact; and
disposing a second compliant member proximate the second contact.

* * * * *